US008159366B2

(12) United States Patent
Choy et al.

(10) Patent No.: US 8,159,366 B2
(45) Date of Patent: Apr. 17, 2012

(54) MEASUREMENT OF CURRENT AND VOLTAGE OF AN IN-ORBIT SOLAR ARRAY

(75) Inventors: Winnie Wai-Yue Choy, Cerritos, CA (US); Ich D. Ngo, Monterey Park, CA (US); David J. Walter, Downey, CA (US); Mark Honda, Torrance, CA (US)

(73) Assignee: The Boeing Company, Chicago, IL (US)

( * ) Notice: Subject to any disclaimer, the term of this patent is extended or adjusted under 35 U.S.C. 154(b) by 944 days.

(21) Appl. No.: 12/174,436

(22) Filed: Jul. 16, 2008

(65) Prior Publication Data

US 2010/0013665 A1     Jan. 21, 2010

(51) Int. Cl.
*H04Q 9/00* (2006.01)
*H02J 7/04* (2006.01)

(52) U.S. Cl. .................................. 340/870.07; 320/162
(58) Field of Classification Search ............. 340/870.07; 320/162
See application file for complete search history.

(56) References Cited

U.S. PATENT DOCUMENTS

| | | | | |
|---|---|---|---|---|
| 5,712,572 A | * | 1/1998 | Tamechika et al. | 324/551 |
| 6,137,266 A | * | 10/2000 | Chalasani et al. | 320/133 |
| 6,268,710 B1 | * | 7/2001 | Koga | 320/116 |
| 6,476,587 B2 | * | 11/2002 | Sasaki | 320/166 |
| 6,753,692 B2 | * | 6/2004 | Toyomura et al. | 324/718 |
| 7,459,887 B2 | * | 12/2008 | Hatanaka | 320/164 |

OTHER PUBLICATIONS

Walters et al., "Materials on the International Space Station Experiment-5 (MISSE-5), Forward Technology Solar Cell Experiment (FTSCE): On-Orbit Data and Post-flight Analysis", 2007 Space Power Workshop, Apr. 24, 2007, US Naval Research Lab, pp. 1-30.

* cited by examiner

*Primary Examiner* — Jared Fureman
*Assistant Examiner* — Scott Bauer
(74) *Attorney, Agent, or Firm* — Yee & Associates, P.C.

(57) ABSTRACT

An apparatus comprises switches, a measurement unit, and a telemetry subsystem. The switches connect the current sources to a power bus when in a first position and to the measurement unit when the switches are in a second position. The measurement unit generates a ramp signal to control the solar strings from an open circuit state to a short circuit state linearly in a short duration and provides continuous current and voltage telemetry data at the output while the set of switches is in the second position. The telemetry subsystem is pre-set to a dwell mode and samples a large amount of voltage and current telemetry data. The telemetry subsystem transmits this data to ground directly to eliminate the need for processing and storage resources in the spacecraft. The telemetry data is used to plot I-V curve for health monitoring.

23 Claims, 4 Drawing Sheets

MEASUREMENT OF CURRENT AND VOLTAGE OF AN IN-ORBIT SOLAR ARRAY

GOVERNMENT LICENSE RIGHTS

This invention was made with Government support under contract number FA8807-04-C-0002 awarded by the United States Air Force. The Government has certain rights in this invention.

BACKGROUND INFORMATION

1. Field

The present disclosure relates generally to processing data and in particular to a method and apparatus for measuring current and voltage. Still more particularly, the present disclosure relates to a method and apparatus for measuring current and voltage of a solar array in space.

2. Background

Spacecraft are vehicles or devices designed for space flight or use in space. Spacecraft may be used for various purposes such as, for example, communications, earth observation, metrology, navigation, planetary exploration, and other suitable uses. A spacecraft has various subsystems that may vary depending on the particular purpose of the spacecraft. Spacecraft subsystems may include attitude determination and control, guidance, navigation, communications, telemetry and command, thermal control, propulsion, and power.

With respect to power, electrical power generation and distribution is typically required in a spacecraft. One typical power generation system is a solar array. A solar array consists of single or multiple solar panels which have a surface area that can be controlled to point towards the sun as a mechanism moves. More exposed surface area means that more electricity may be converted from light energy. A solar panel typically consists of multiple solar strings. A solar string is a group of solar cells connected in series.

Solar arrays may be monitored by collecting voltage and current data to determine whether the solar arrays are performing as predicted. The data collected may be used to create a current voltage (I-V) curve for evaluation. To create a high fidelity I-V curve, a large number of voltage and current data points are required. The data must also be collected in a short duration in order to minimize temperature effects on a solar cell voltage/current relationship. With the spacecraft in orbit, this large amount of data may typically be stored in the spacecraft and transmitted to earth through wireless communications at a later time.

SUMMARY

The advantageous embodiments provide a method and apparatus for measuring a current and voltage system of a spacecraft. In one advantageous embodiment, an apparatus comprises a set of switches, a measurement unit, and a telemetry subsystem. The set of switches is capable of receiving current from a set of current sources. The measurement unit has an input and a telemetry output, wherein the input is connected to the set of switches. The telemetry subsystem is connected to the telemetry output of the measurement unit. The telemetry subsystem is capable of receiving telemetry data from the telemetry output. The set of switches is capable of connecting the set of current sources to a power bus when the set of switches is in a first position and is capable of connecting the set of current sources to the measurement unit when the set of switches is in a second position. The measurement unit is capable of generating a plurality of current and voltage measurements to form the telemetry data at the telemetry output while the set of switches is in the second position.

In another advantageous embodiment, a current and voltage measurement system for a spacecraft comprises a set of switches, a power bus, a measurement unit, and a telemetry subsystem. The set of switches is capable of receiving current from a plurality of current sources for the spacecraft and capable of selecting a set of current sources from the plurality of current sources. The power bus is connected to a first output in the set of switches. The measurement unit has a voltage measurement circuit, a current measurement circuit, an input, and a telemetry output, wherein the input is connected to a second output of the set of switches. The measurement unit is capable of generating a plurality of current and voltage measurements to form telemetry data at the telemetry output while the set of switches is in the second position during a period of time when a temperature of the plurality of current sources does not change in more than a selected amount. The telemetry subsystem is connected to a telemetry output in the measurement unit, wherein the telemetry subsystem is capable of receiving telemetry data from the telemetry output in a dwell mode. The set of switches has an input connected to the set of current sources, connects the set of current sources to the power bus when the set of switches is in a first position, connects the set of current sources to the power bus, and connects the set of current sources to the measurement unit when the set of switches is in a second position.

In yet another advantageous embodiment, a method for monitoring current and voltage for a set of current sources is present. A position of a set of switches is changed from a first position to a second position, wherein the set of switches connects the set of current sources to a measurement unit when the set of switches is in the second position. A plurality of current measurements and a plurality of voltage measurements are generated for the current with the set of switches in the second position for a period of time during which a temperature of the plurality of current measurements do not change in more than a selected amount. The plurality of current measurements and the plurality of voltage measurements are collected with a telemetry subsystem in a dwell mode to form current and voltage data. The current and voltage data is sent to a remote location over a wireless communications link.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
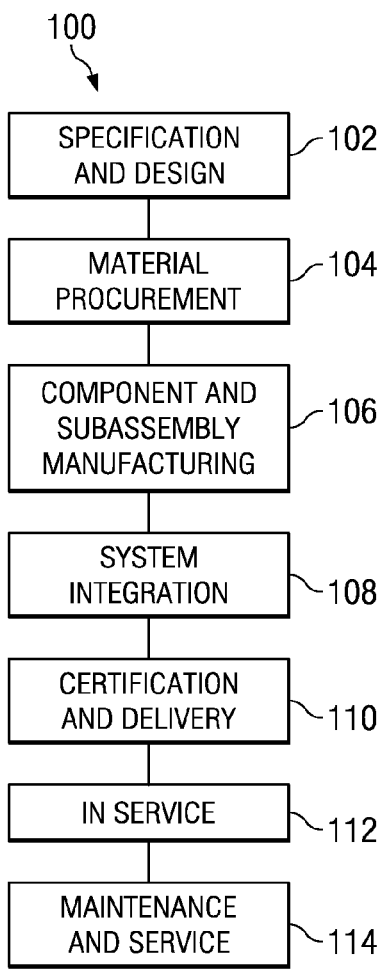
FIG. 1 is a diagram illustrating a spacecraft manufacturing and service method in which an advantageous embodiment may be implemented.

Referring more particularly to the drawings, embodiments of the disclosure may be described in the context of the spacecraft manufacturing and service method 100 as shown in FIG. 1. Turning first to FIG. 1, a diagram illustrating a spacecraft manufacturing and service method is depicted in accordance with an advantageous embodiment. During pre-production, exemplary spacecraft manufacturing and service method 100 may include specification and design 102 of a spacecraft and material procurement 104.

During production, component and subassembly manufacturing 106 and system integration 108 of a spacecraft takes place. Thereafter, the spacecraft may go through certification and delivery 110 in order to be placed in service 112. While in service, the spacecraft may be in some instances scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be a government, leasing company, military entity, service organization, and or some other entity. These previous paragraphs are used to provide context for a lay reader as to where the invention may be used and what stage.

The different advantageous embodiments recognize that adding the capability of measuring a solar array I-V curve may impact other spacecraft subsystem and can add significant design complexity to the spacecraft. The different advantageous embodiments recognize the potential impact and that efforts are made to minimize spacecraft design impact The different advantageous embodiments recognize that collecting a large amount of data in a short duration, such as measuring I-V curve for solar arrays, may involve the use of processors and storage devices located on the spacecraft. These types of components may add to the weight of the spacecraft. The different advantageous embodiments recognize that it would be useful to reduce the weight and complexity of the spacecraft by eliminating the need for as many components as possible. This type of usage, however, uses up resources in a spacecraft that may be used for other purposes.

In monitoring power sources, one assessment that may be made is the health of the power source. For example, the health of a solar array may be evaluated based on the collection of current and voltage data. A current voltage curve may be created and trended to determine whether a solar array is performing to prediction.

The different advantageous embodiments recognize that current measurement systems for a current source, such as a solar array, are unable to provide the needed data. Some currently available systems are only capable of measuring the total current, while other systems may only measure an open circuit voltage. These types of measurements are unable to provide the needed data points to identify the current and voltage relationship and/or generate a current voltage curve for analysis.

The different advantageous embodiments recognize that in collecting this type of data, the data must be collected quickly enough to avoid temperature changes that would affect the desired accuracy of an analysis of the data. If the temperature of the solar circuit under test changes during collection of data by more than some selected amount, it may be more difficult to correlate and/or impossible to accurately analyze the data.

Thus, the different advantageous embodiments provide a method and apparatus for monitoring the current and voltage produced by a power source, such as a solar array. In one embodiment, an apparatus has a set of switches, a measurement unit, and a telemetry subsystem. The set of switches is capable of receiving current from a set of current sources. A set, as used herein, refers to one or more items. For example, a set of switches is one or more switches. In these examples, the set of switches forms a switch unit.

The measurement unit has an input and a telemetry output. The telemetry subsystem is connected to the telemetry output of the measurement unit and is capable of receiving telemetry data from the telemetry output of the measurement unit.

The set of switches is connected to the set of current sources and connects the current sources to a power bus in a first position. The set of switches connects the current sources to the measurement unit when the switches are in a second position. In these examples, the measurement unit is only connected to one current source at a time. Any current sources that are not used for current and voltage measurements are connected to the power bus. The measurement unit generates current and voltage measurements at the telemetry outputs, while the set of switches is in the second position.

Although, in these examples, the measurement unit may be connected only to a single current source at a time, in other advantageous embodiments, the measurement unit may be connected to multiple current sources.

With this type of measurement, data points for current and voltage measurements relating to the current generated by a set of current sources may be obtained. In these examples, the set of current sources may be a set of solar circuits. This type of measurement apparatus and method for the advantageous embodiments may control the voltage of the current sources in a linear manner from an open circuit condition to a short circuit condition. This control of the voltage occurs during a period of time that minimizes the heating up of the current source.

In other words, a temperature change does not occur in the current source being measured, or the temperature change is small enough during the measurement such that changes to current voltage characteristics for a current voltage plot are unaffected with respect to the desired analysis.

Figure 2:
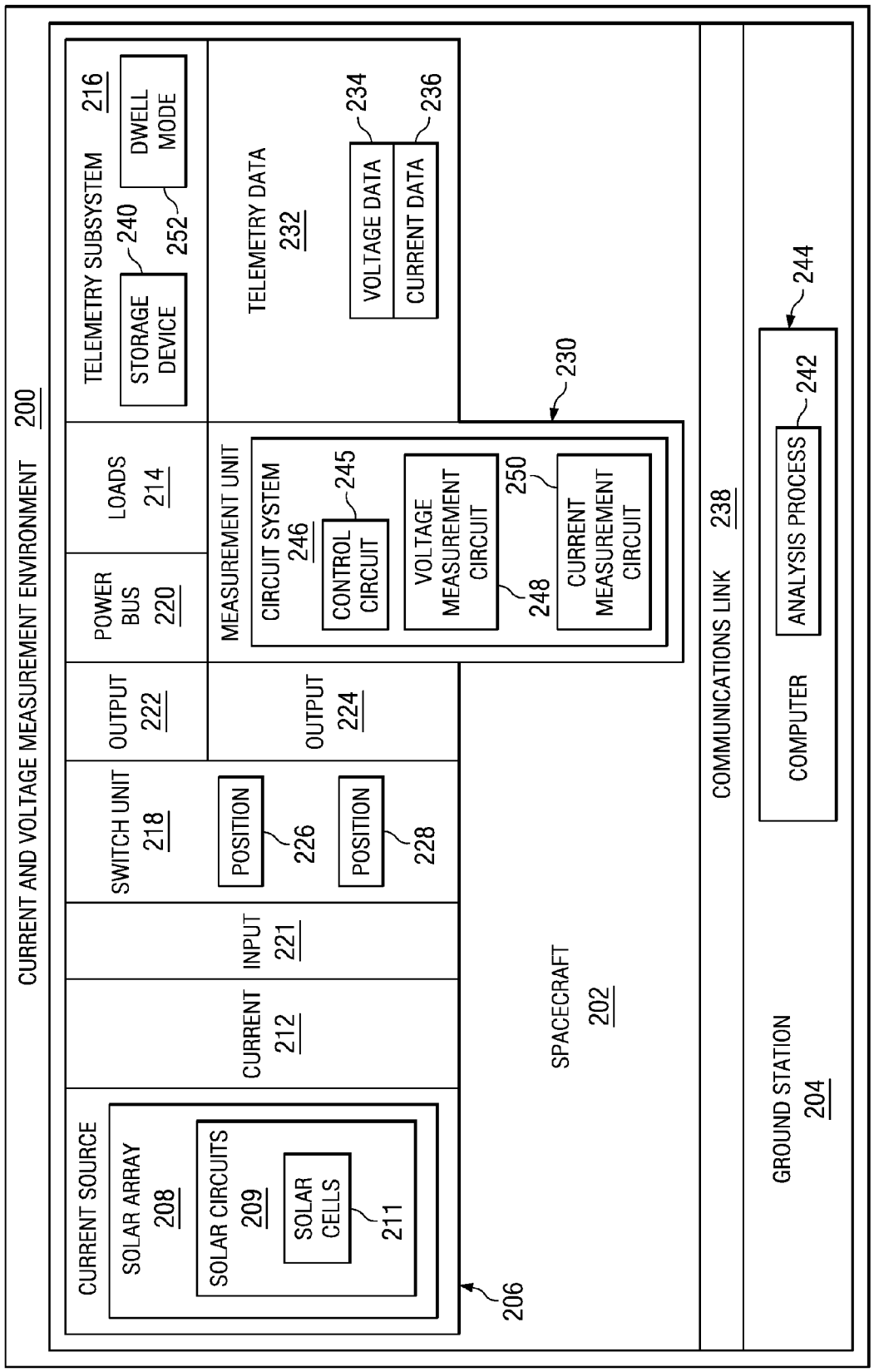
FIG. 2 is a block diagram of a current and voltage measurement environment in accordance with an advantageous embodiment.

With reference now to FIG. 2, a block diagram of a current and voltage measurement environment is depicted in accordance with an advantageous embodiment. In this example, current and voltage measure environment 200 includes spacecraft 202 and ground station 204. Spacecraft 202 is an example of a spacecraft that may be manufactured and serviced using spacecraft manufacturing and service method 100 in FIG. 1.

In this example, spacecraft 202 may take various forms. For example, spacecraft 202 may be a satellite, a space shuttle, a space station, or some other suitable type of spacecraft. Spacecraft 202 includes current source 206. Current source 206 may take various forms. Current source 206 may be, for example, solar array 208. In this example, solar array 208 may be formed from solar circuits 209. Each solar circuit within solar circuits 209 may be formed from solar cells 211.

In other advantageous embodiments, current source 206 may be a solar circuit within solar circuits 209. The manner in which current source 206 is defined may vary depending on the particular embodiment. In other advantageous embodiments, current source 206 may take other forms.

Current source 206 provides power to loads 214 and telemetry subsystem 216. In these examples, current source 206 is connected to loads 214 and telemetry subsystem 216 through switch unit 218 and power bus 220. Loads 214 may include various components such as, for example, a navigation system, a computer, an electrical system, or some other suitable system. Telemetry subsystem 216 is an example of a particular type of load.

In these examples, switch unit 218 connects to current source 206 at input 221. Current source 206 generates current 212. In these examples, current 212 may take the form of a number of different currents generated by multiple currents within current source 206. Switch unit 218 includes output 222 and output 224. Output 222 is connected to power bus 220. Output 224 is connected to measurement unit 230. Switch unit 218 connects current source 206 to output 222 when switch unit 218 is in position 226. In this position, current source 206 is connected to power bus 220 and provides power to loads 214. Switch unit 218 connects current source 206 to output 224 when switch unit 218 is in position 228. Switch unit 218 may be commanded to change between position 226 and position 228 in a manner that allows for the measurement of current 212.

For example, switch unit 218 connects current source 206 through output 224 to measurement unit 230 when switch unit 218 is in position 228. When current source 206 is connected to measurement unit 230, measurement unit 230 generates telemetry data 232. Telemetry data 232 includes voltage data 234 and current data 236 in these illustrative examples.

Telemetry data 232 may be sampled by telemetry subsystem 216, which may be set to dwell mode 252, for transmission to ground station 204 through communications link 238. In these examples, sampling means to obtain data. Dwell mode 252 is one operating mode for a spacecraft when telemetry subsystem 216 only focuses on a small subset of the spacecraft telemetry so telemetry subsystem 216 can collect more data points from this small subset of telemetry.

In some advantageous embodiments, telemetry data 232 may be stored in telemetry subsystem 216 within storage device 240. Ground station 204 may process telemetry data 232 using analysis process 242, which executes on computer 244, located at ground station 204.

In these examples, measurement unit 230 may take the form of circuit system 246, which generates telemetry data 232 from current source 206 by controlling solar array 208. Telemetry data 232 may be generated from open circuit to short circuit states. The open circuit to short circuit states may be generated by switch unit 218 moving from position 226 to position 228. The measurements are with a duration that is short enough such that solar cells within solar array 208 may not heat up enough to change the current voltage characteristics. In these examples, circuit system 246 also includes control circuit 245, voltage measurement circuit 248, and current measurement circuit 250.

Control circuit 245 controls a source within current source 206 from an open circuit to a short circuit within a selected period of time to generate current and voltage measurements. In these examples, the current and voltage measurements are continuous measurements. In these examples, control circuit 245 controls solar circuits 209 to move from an open circuit to a short circuit state while providing continuous voltage data 234 and current data 236 for telemetry data 232. Continuous means that the data is generated without interruption and/or stopping and restarting.

In these examples, the duration between the open circuit state to short circuit state may be, for example, without limitation, around 1 to 2 seconds. Of course, other durations may be selected depending on the particular implementation. Voltage measurement circuit 248 may generate voltage data 234, while current measurement circuit 250 may generate current data 236.

In these illustrative examples, telemetry data 232 is processed by telemetry subsystem 216 in dwell mode 252. When telemetry subsystem 216 is in dwell mode 252, telemetry subsystem 216 may sample more data points than when telemetry subsystem 216 is in normal mode. The faster sampling may be referred to as continuously sampling of the data. Continuously sampling means that the data is obtained or sampled as fast as possible. Dwell mode 252 is a mode in which telemetry subsystem 216 may focus on a selected number of telemetry data, such as telemetry data 232, generated by measurement unit 230. In other words, telemetry subsystem 216 does not collect telemetry data from some other components in loads 214 when in dwell mode 252.

As a result, the collection of telemetry data 232 may be performed on a continuous basis by telemetry subsystem 216. In other words, telemetry subsystem 216 may collect as many data points as possible as opposed to collecting a few data points within the same period of time when telemetry subsystem 216 is not in dwell mode 252. As a result, telemetry subsystem 216 allows for a higher sampling rate of data from various sources such as, for example, measurement unit 230.

In some advantageous embodiments, telemetry subsystem 216 may still obtain critical telemetry data from loads 214, but ignore or not collect other telemetry data while in dwell mode 252. Critical data may be, for example, data needed to ensure that spacecraft 202 is operating correctly and/or is not in danger of failing.

In these different advantageous embodiments, measurement unit 230 does not include analysis or storage resources. Instead, the processing resources needed to analyze telemetry data 232 are located at ground station 204. These processing resources include, for example, computer 244 and software. As a result, with transmitting the data to ground station 204, the complexity requirements for additional processing capabilities may be eliminated from spacecraft 202.

By distributing or using processing resources at ground station 204, a reduction in components may be achieved for spacecraft 202. In this manner, the impact of spacecraft 202's design may be reduced. Further, even if other processing resources are present in spacecraft 202, the use of these resources is not needed by sending telemetry data 232 to ground station 204. In this manner, any available processing resources on spacecraft 202 may be used for other purposes.

Thus, the different advantageous embodiments may reduce spacecraft 202's design impact. Further, weight also may be reduced with this type of design of spacecraft 202. Resources that would be used to store telemetry data 232 may be made available for other functions on spacecraft 202 through sending the telemetry data to a ground station.

In the different advantageous embodiments, the collection of telemetry data is performed in a manner that allows for the collection of sufficient telemetry data to perform an analysis within an amount of time such that a change in temperature in the solar array is minimized to a point that does not affect the desired accuracy of a current voltage curve generated from the telemetry data. In this manner, the different advantageous embodiments provide a capability for a more accurate prediction of solar array performance through the collection of current and voltage data.

The illustration of components within current and voltage measurement environment 200 in FIG. 2 is presented for purposes of illustrating one manner in which an advantageous embodiment may be implemented. This example is not meant to imply architectural or physical limitations in a manner in which different advantageous embodiments may be implemented.

For example, in other advantageous embodiments, current and voltage measurement environment 200 may include multiple spacecrafts rather than just spacecraft 202. As another example, in other embodiments, multiple measurement units, such as measurement unit 230, may be present in spacecraft 202 to measure current and voltage data from different types of current sources within current source 206. In other advantageous embodiments, multiple measurement units may be present for different current sources depending on the particular embodiment. In yet other embodiments, a portion of current source 206 may supply current to power to loads 214, while another portion of current source 206 may supply current to measurement unit 230 to generate measurements of current and voltage to generate voltage data 234 and current data 236 in telemetry data 232. In this type of embodiment, current source 206 may include two solar circuits in solar circuits 209. One of these solar circuits may be switched to power bus 220, while the other solar circuit is switched to measurement unit 230.

Figure 3:
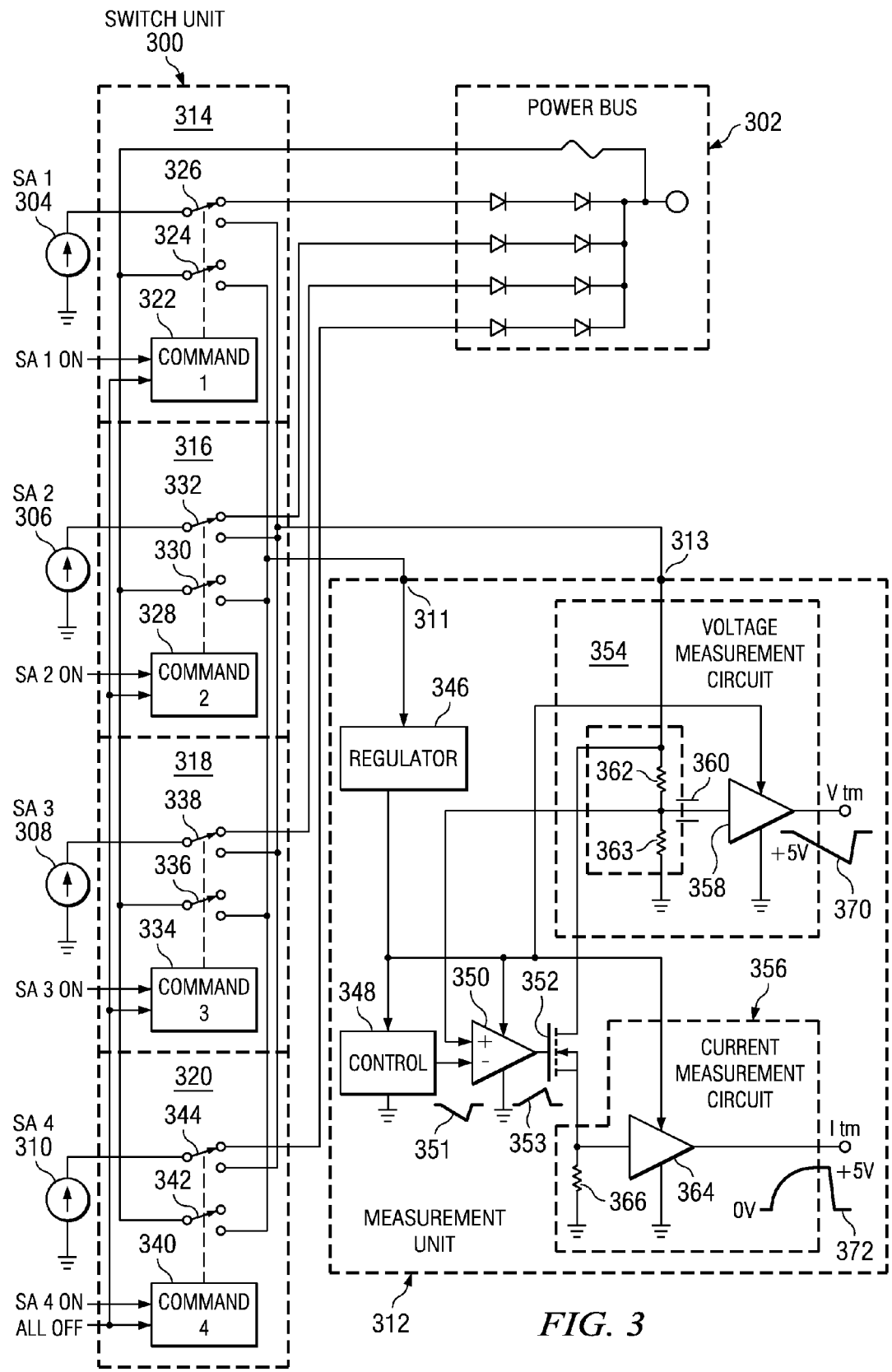
FIG. 3 is a diagram illustrating the interconnect of units used to measure current and voltage data in accordance with an advantageous embodiment.

With reference now to FIG. 3, a diagram illustrating the interconnect of units used to measure current and voltage data is depicted in accordance with an advantageous embodiment. In this example, switch unit 300 may connect current sources 304, 306, 308, and 310 to power bus 302 and measurement unit 312 on a selective basis.

In a first position or state, switch unit 300 connects current sources 304, 306, 308, and 310 from solar arrays to power bus 302. When one of the switches in switch unit 300 is commanded to a second position, one of current sources 304, 306, 308, and 310 from solar arrays is connected to measurement unit 312. A second contact in switch unit 300 connects power bus 302 to measurement unit 312, which enables the start of the current and voltage measurements. Input 311 is a power input that provides power to measurement unit 312, while input 313 is a sensing input to measurement unit 312 to control current and voltage measurements.

In this example, switch unit 300 includes latching relays 314, 316, 318, and 320. Latching relay 314 has relay driver 322, switch 324, and switch 326; latching relay 316 has relay driver 328, switch 330, and switch 332; latching relay 318 has relay driver 334, switch 336, and switch 338; and latching relay 320 has relay driver 340, switch 342, and switch 344. The different relay drivers control the positions of switches within the latching relays to direct currents from associated solar arrays to either power bus 302 or measurement unit 312.

In these examples, two switches are present in switch unit 300. For example, switches 326, 332, 338, and 344 are in a first set, while switches 324, 330, 336, and 342 are in a second set. These two sets of switches may be selected to send current to measurement unit 312 from power bus 302 when the switch unit is in the first position or to only send current to power bus 302 when in the second position. In these examples, latching relays 314, 316, 318, and 320 may be controlled such that only one of current sources 304, 306, 308, and 310 is connected to measurement unit 312. In these examples, a current source may be a particular solar circuit within a solar array.

In other advantageous embodiments, latching relays 314, 316, 318, and 320 may be controlled to connect at least one of current sources 304, 306, 308, and 310 to measurement unit 312. As used herein, the phrase "at least one of", when used with a list of items, means that different combinations one or more of the items may be used and only one of each item in the list may be needed. For example, "at least one of item A, item B, and item C" may include, for example, without limitation, item A, or item A and item B. This example also may include item A, item B, and item C, or item B and item C.

When switch unit 300 is in a second position, some or all of current sources 304, 306, 308, and 310 may be switched to measurement unit 312, while some of these currents may still be connected to power bus 302. For example, switch unit 300 may only connect current source 304 to measurement unit 312, while current sources 306, 308, and 310 continue to be connected to power bus 302. In another example, when switch unit 300 is in the second position, current sources 306, 308, and 310 may be connected to measurement unit 312 to measure current and voltage for these currents, while current source 304 continues to be connected to power bus 302. In other words, switch unit 300 may allow for individual testing of different solar arrays as well as testing the solar arrays in different groupings.

In these examples, only one current source is switched to measurement unit 312. The number of circuits is minimized by using one measurement unit for multiple current sources and switching in one current source at a time.

Measurement unit 312 includes regulator 346, control 348, amplifier 350, transistor 352, voltage measurement circuit 354, and current measurement circuit 356. Voltage measurement circuit 354 is an example of one implementation for voltage measurement circuit 248 in FIG. 2 and includes amplifier 358 and voltage divider 360. In these examples, amplifier 358 takes the form of a gain amplifier. Voltage divider 360 includes resistor 362 and resistor 363. Current measurement circuit 356 is an example of one implementation for current measurement circuit 250 in FIG. 2 and includes amplifier 364 and resistor 366. Amplifier 364, in this depicted example, is a gain amplifier.

As illustrated, regulator 346 may receive power through switch unit 300 through input 311 in measurement unit 312. For example, switches 324, 330, 336, and 342 connect at least one of current sources 304, 306, 308, and 310 to input 311 to provide power to control 348 in measurement unit 312. The gate of transistor 352 is connected to control 348, the source of transistor 352 is connected to resistor 366, and the gate of transistor 352 is connected to amplifier 350.

In these examples, transistor 352 may be a metal-oxide-semiconductor field effect transistor (MOSFET). In this example, transistor 352 may be an N-channel transistor in an enhancement mode. The drain of transistor 352 is connected to the positive side of a current source of one of switches 324, 330, 336, and 342. A source of transistor 352 is connected to resistor 366, which returns to the negative side of a current source. In this manner, control 348 is capable of controlling the drain of transistor 352 to vary a current source voltage linearly from input 313 from an open circuit state to a short circuit state. In these examples, control 348 is capable of controlling the drain of transistor 352 to vary a voltage of a current source linearly from an open circuit state to a short circuit state when the set of switches is in the second position to generate the measurements for the telemetry data.

Regulator 346 acts as a voltage regulator, in these examples, and provides power to control 348 and amplifier 350. Control 348 may generate negative ramp signal 351 to control the gate of transistor 352 from an off state to positively linear ramp on state. In this example, negative ramp signal 351 is a negative linear ramp signal. Amplifier 350 receives negative ramp signal 351 from control 348 and amplifies negative ramp signal 351 to form amplified positive ramp signal 353. Amplified positive ramp signal 353 is sent to the gate of transistor 352. The transition of amplified positive ramp signal 353 controls the gate of transistor 352 from an off state to an on state. In these examples, the transition is a linear transition. The drain of transistor 352 changes or controls the current source voltage from an open circuit state to a short circuit state using a linear transition in these examples.

This transition controls the amount of current that is transferred from input 313 to voltage measurement circuit 354 and current measurement circuit 356. This current causes voltage measurement circuit 354 to generate voltage data 370. The current also causes current measurement circuit 356 to generate current data 372. This data forms the two types of telemetry data that is collected or sampled by the telemetry subsystem. In this manner, negative ramp signal 351 controls the voltage measured by measurement unit 312.

In this manner, the on and off state of transistor 352 may be used to sample as many data points as possible before a temperature change occurs in the solar arrays, voltage measurement circuit 354, and current measurement circuit 356. The on and off state of transistor 352 as controlled by control 348 may be used to generate the limited duration between an open circuit state and a short circuit state of any of current sources 304, 306, 308, and 310 connected to voltage measurement circuit 354.

The illustration of the different units and components in FIG. 3 are provided for purposes of illustrating one manner in which different advantageous embodiments may be implemented. Of course, this illustration is not meant to provide physical or architectural limitations to the manner in which other embodiments may be implemented. For example, switch unit 300 may have other number of latching relays and relay drivers. In these examples, the number of latching relays used may be dependent on the number of solar circuits that may be selected for current and voltage measurements.

The illustration of different components used to measure current and voltage for a set of solar arrays in FIG. 3 is presented for purposes of illustrating one advantageous embodiment. This illustration is not meant to imply physical or architectural limitations in a manner in which other advantageous embodiments may be implemented.

Figure 4:
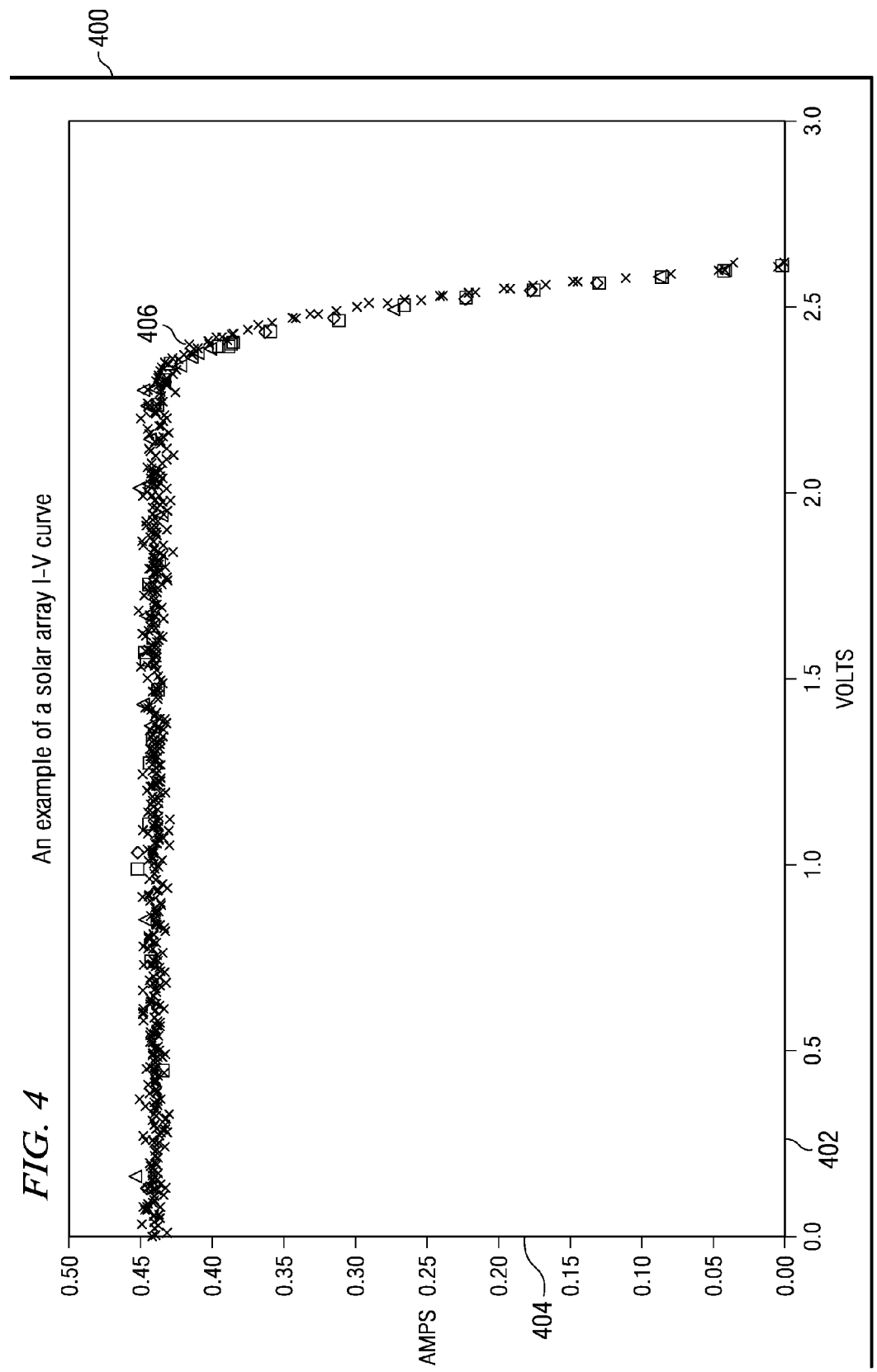
FIG. 4 is a diagram illustrating telemetry data in accordance with an advantageous embodiment.

With reference now to FIG. 4, a diagram illustrating telemetry data is depicted in accordance with an advantageous embodiment. In this example, graph 400 is a graph of telemetry data obtained from a measurement unit such as, for example, measurement unit 312 in FIG. 3. Graph 400 shows a graph for a current voltage curve. X axis 402 represents voltage in volts, while Y axis 404 represents current in amperes. The different data points in curve 406 are examples of data that may be generated from a measurement unit and sampled by a telemetry subsystem. In this example, the current is fairly constant with respect to voltage but decreases rapidly as the voltage increases after reaching a certain voltage (the knee of the solar circuit). This information may be analyzed to determine the health of a set of solar arrays.

Figure 5:
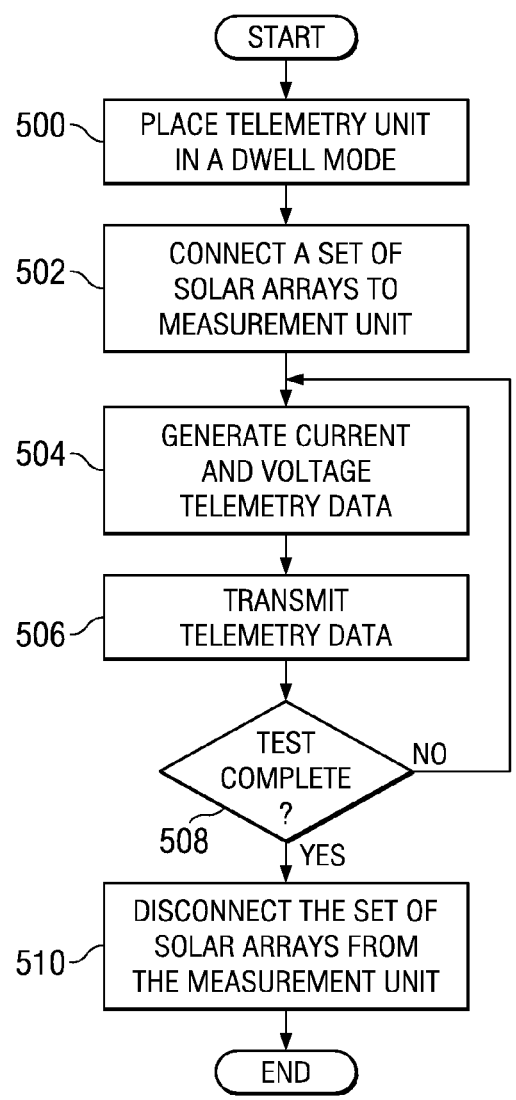
FIG. 5 is a flowchart of a process for measuring current and voltage for a set of solar arrays in accordance with an advantageous embodiment.

With reference now to FIG. 5, a flowchart of a process for measuring current and voltage for a set of solar arrays is depicted in accordance with an advantageous embodiment. The process illustrated in FIG. 5 may be implemented in a spacecraft, such as spacecraft 202 in FIG. 2, to measure current and voltage generated by a set of solar arrays.

The process begins by placing a telemetry unit in a dwell mode (operation 500). This dwell mode allows the telemetry unit to focus on a limited number of types and/or sources of telemetry data. In these examples, the telemetry data is limited to the current and voltage measurements made by the measurement unit. Of course, other critical or essential types of data also may be monitored.

The process connects a set of solar arrays to the measurement unit (operation 502). The set of solar arrays may be one or more solar arrays present in the spacecraft. Operation 502 may select a single solar array for testing or measurement or may select multiple solar arrays for testing or measurement.

The process generates current and voltage telemetry data (operation 504). Operation 504 is generated using the measurement unit, as the measurement unit switches from a short circuit state to an open circuit state. This switching from the short circuit state to the open circuit state results in a voltage transition. Current and voltage measurements may be made at the short circuit state, through the voltage transition, and at the open circuit state, in these examples, to generate current and voltage data for a current voltage curve. The short circuit state is present when the voltage is at its lowest level and an open circuit state is present when the voltage is at the highest level.

The process then transmits the telemetry data (operation 506). This telemetry data is transmitted by the telemetry unit in these examples. A determination is made as to whether the test is complete (operation 508). If the test is not complete, the process returns to operation 504 to continue to generate the current and voltage telemetry data.

Otherwise, the process disconnects the set of solar arrays from the measurement unit (operation 510), with the process terminating thereafter. In operation 510, the set of solar arrays may be reconnected to the power bus to continue to power other loads.

The process illustrated in FIG. 5 may be repeated as many times as desired to obtain additional I-V curves. These additional I-V curves may be averaged to obtain more accurate plots of the measurements. Further, this process may be repeated for various solar circuits.

The illustration of the process in FIG. 5 is presented for purposes of illustrating one manner in which current and voltage measurements may be made. Other operations in addition to or in place of the ones illustrated in FIG. 5 may be employed in some advantageous embodiments. Further, the order of the operations also may be different in other advantageous embodiments. For example, in some advantageous embodiments, the telemetry data transmitted in operation 506 may not be transmitted as the testing is performed. Instead, this data may be temporarily sorted in a buffer until the testing is complete.

Thus, the different advantageous embodiments provide a method and apparatus for monitoring current and voltage for a set of current sources. The different advantageous embodiments include an apparatus having a set of switches, a measurement unit, and a telemetry unit. The set of switches is capable of receiving current from a set of current sources. The measurement unit has an input and a telemetry output. The input is connected to the set of switches. The telemetry unit is connected to the telemetry output of the measurement unit in these examples.

The telemetry unit is capable of receiving telemetry data from the telemetry output. The set of switches is capable of connecting the set of current sources to a power bus when the set of switches is in a physical first position. The set of switches is capable of connecting the set of current sources to the measurement unit when the set of switches is in the second position. The measurement unit generates current and voltage measurements at the telemetry output while the switches are in the second position.

The telemetry unit sends the data to a data processing system for storage and/or analysis. This data processing system may be located remotely such as, for example, at a ground station. The telemetry unit may send this data while in a dwell mode.

In this manner, the different advantageous embodiments may make current and voltage measurements during the period of time the temperature of the current sources do not change more than a selected amount. In some advantageous embodiments, the change in temperature is no change while in other advantageous embodiments, a small temperature change may be acceptable as long as the change does not affect the current and voltage curve in a manner that is not allowed for the desired accuracy in analysis.

Further, the different advantageous embodiments also reduce the need for specialized circuits or devices on the spacecraft, reducing the weight of the spacecraft. The different advantageous embodiments also do not require the use of other processing resources that may be present to analyze and/or store the data.

The description of the different advantageous embodiments has been presented for purposes of illustration and description, and is not intended to be exhaustive or limited to the embodiments in the form disclosed. Many modifications and variations will be apparent to those of ordinary skill in the art. Additionally, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a set of switches capable of switching a set of current sources;
   a measurement unit having an input and a telemetry output, wherein the input is connected to the set of switches; and
   a telemetry subsystem connected to the telemetry output in the measurement unit, wherein the telemetry subsystem is capable of sampling telemetry data from the telemetry output, the set of switches is capable of connecting the set of current sources to a power bus when the set of switches is in a first position, the set of switches is capable of connecting the set of current sources to the measurement unit when the set of switches is in a second position, and the measurement unit is capable of generating a plurality of continuous current and voltage measurements to form the telemetry data at the telemetry output while the set of switches is in the second position.

2. The apparatus of claim 1 further comprising:
   the set of current sources.

3. The apparatus of claim 1, wherein the telemetry subsystem is capable of sampling more telemetry data on fewer telemetry outputs in a dwell mode.

4. The apparatus of claim 1, wherein the measurement unit comprises:
   a voltage regulator;
   a voltage measurement circuit;
   a current measurement circuit; and
   a control circuit.

5. The apparatus of claim 4, wherein the voltage measurement circuit comprises a gain amplifier measuring a voltage from a voltage divider.

6. The apparatus of claim 4, wherein the current measurement circuit comprises a gain amplifier measuring a voltage across a resistor.

7. The apparatus of claim 4, wherein the control circuit comprises:
   a controller, wherein the controller is capable of generating a linear ramp signal; and
   a transistor having a gate connected to the controller, a drain connected to the high side of a current source through a switch, and a source connected to a resistor which returns to the low side of a current source, wherein the controller is capable of controlling the drain of the transistor to vary a voltage of the current source linearly from an open circuit state to a short circuit state when the set of switches is in the second position to generate the voltage measurements by the voltage measurement circuit and current measurements by the current measurement circuit.

8. The apparatus of claim 7, wherein the controller circuit further comprises:
   a ramp generator capable of generating the linear ramp signal.

9. The apparatus of claim 1, wherein the set of current sources is at least one of a set of solar arrays, a set of solar strings, and a set of solar cells.

10. The apparatus of claim 1, wherein the input of the measurement unit comprises a voltage regulator capable of receiving power to initiate the plurality of continuous current and voltage measurements for the current source.

11. The apparatus of claim 1, wherein the set of current sources is a portion of all of the current sources.

12. The apparatus of claim 1, wherein the measurement unit makes the plurality of current and voltage measurements during a period of time when a temperature of the set of current sources does not change more than a selected amount.

13. The apparatus of claim 1, wherein the current and voltage measurements generated by the measurement unit is continuous during a period of time.

14. The apparatus of claim 1, wherein the voltage and current measurements are initiated in the measurement unit in response to the set of switches switching a set of current sources to the measurement unit in the second position.

15. The apparatus of claim 1, wherein set of current sources are connected to the power bus to supply power to a set of loads when the set of switches are all in the first position.

16. The apparatus of claim 1 further comprising:
   a spacecraft, wherein the set of switches, the power bus, the measurement unit, and the telemetry subsystem are located in the spacecraft.

17. The apparatus of claim 1, wherein the set of switches, the power bus, the measurement unit, and the telemetry unit are located in one of a satellite, spacecraft, a space shuttle, an aircraft, a ship, a vehicle, an office building, and a power plant.

18. A current and voltage measurement system for a spacecraft comprising:
   a set of switches capable of receiving current from a plurality of current sources for the spacecraft and capable of selecting a set of current sources from the plurality of current sources;
   a power bus connected to a first output in the set of switches;
   a measurement unit having a voltage measurement circuit, a current measurement circuit, an input, and a telemetry output, wherein the input is connected to a second output of the set of switches, wherein the measurement unit generates a plurality of continuous current and voltage measurements to form telemetry data at the telemetry output while the set of switches is in the second position during a period of time when a temperature of the plurality of current sources does not change in more than a selected amount; and a telemetry subsystem connected to a telemetry output in the measurement unit, wherein the telemetry subsystem is capable of sampling the telemetry data from the telemetry output in a dwell mode, wherein the set of switches has an input connected to the set of current sources, wherein the set of switches connects the set of current sources to the power bus when the set of switches is in a first position, the set of switches connects the set of current sources to the power bus, and wherein the set of switches connect the set of current sources to the measurement unit when the set of switches is in a second position.

19. A method for monitoring current and voltage for a set of current sources, the method comprising:

changing a position of a set of switches from a first position to a second position, wherein the set of switches connects the set of current sources to a measurement unit when the set of switches is in the second position;

generating a plurality of current measurements and a plurality of voltage measurements for the current with the set of switches in the second position for a period of time during which a temperature of the set of current sources does not change in more than a selected amount;

collecting the plurality of current measurements and the plurality of voltage measurements with a telemetry subsystem in a dwell mode to form current and voltage data; and transmitting the current and voltage data to a remote location over a wireless communications link.

20. The method of claim 19 further comprising:
analyzing the current and voltage data at the remote location to determine a health of the set of current sources.

21. The method of claim 19 further comprising:
generating a current voltage graph from the current and voltage data.

22. The method of claim 19, wherein the method is performed in a spacecraft.

23. The method of claim 19, wherein the period of time is within a defined period of time during which the set of current sources is controlled to transition from an open circuit state to a short circuit state.

* * * * *